E. F. HARPER.
MEANS FOR FOCUSING FOR USE IN CONNECTION WITH FILM CAMERAS.
APPLICATION FILED MAY 28, 1914.
1,243,934.
Patented Oct. 23, 1917.
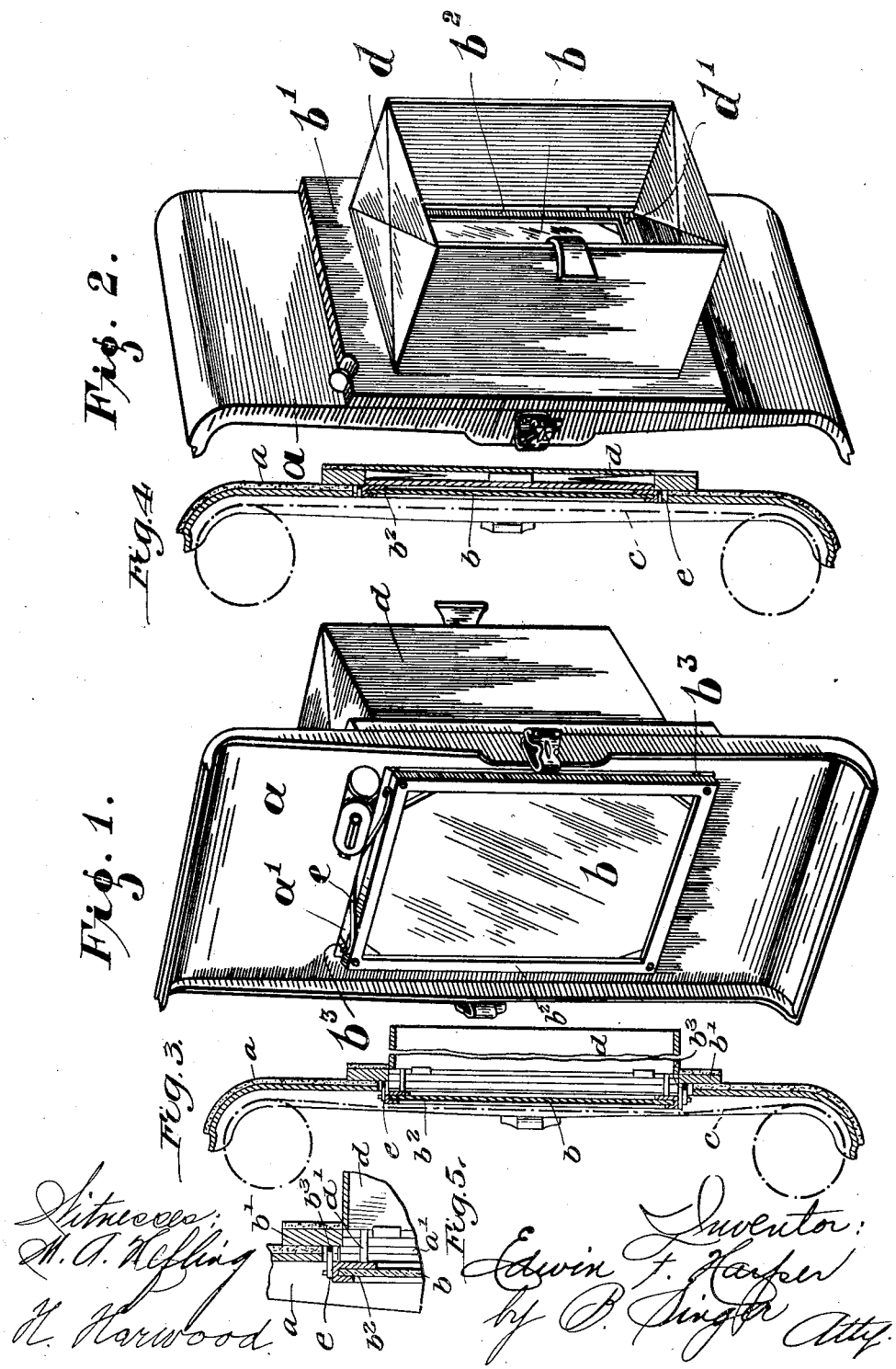

UNITED STATES PATENT OFFICE.

EDWIN FRANCIS HARPER, OF HARBORNE, BIRMINGHAM, ENGLAND.

MEANS FOR FOCUSING FOR USE IN CONNECTION WITH FILM-CAMERAS.

1,243,934.      Specification of Letters Patent.      Patented Oct. 23, 1917.

Application filed May 28, 1914. Serial No. 841,602.

*To all whom it may concern:*

Be it known that I, EDWIN FRANCIS HARPER, a subject of the Kingdom of Great Britain, residing at Fenwick House, Lordswood Road, Harborne, Birmingham, in the county of Warwick, England, accountant, have invented a certain new or Improved Means for Focusing for Use in Connection with Photographic-Film Cameras, of which the following is a specification.

This invention comprises new or improved means for focusing for use in connection with photographic roll film cameras, and is particularly applicable to that type of camera known as a pocket folding camera in which the film of sensitized material is passed from one roller to another across the rear portion of the camera, the object of this invention being to considerably facilitate and expedite the operation of focusing, and enable such focusing to be effected with absolute exactitude and accuracy for any desired distance.

According to the present invention a focusing screen adapted to be automatically inserted into and displaced from the plane or position normally occupied by the film is provided for use in connection with a film which is of such a character as to enable focusing to be effected without necessitating the removal of said film from its position in front of the focusing screen.

The movement of the focusing glass member or screen into position for focusing is advantageously automatically effected by the action of opening or extending a folding hood or screen, the closing or folding of said hood automatically returning the focusing glass to its normal position.

In order that this invention may be clearly understood and more readily carried into practice, reference may be had to the appended explanatory two sheets of drawings upon which:—

Figure 1 is a front or interior view in perspective of the rear portion of a film camera illustrating the focusing means according to the present invention incorporated therewith.

Fig. 2 is a rear view in perspective of the arrangement illustrated in Fig. 1.

Fig. 3 is a sectional elevation illustrating one method of moving the focusing glass member into the plane normally occupied by the film.

Fig. 4 is a sectional elevation illustrating the focusing glass member in the retracted or normal position.

Fig. 5 is an enlarged detail view of a part of Fig. 3, showing more clearly the action of the device.

In a convenient embodiment of this invention within the rear portion $a$ of the casing of a roll film folding camera, an opening $a^1$ is formed advantageously of rectangular formation in focusing alinement with the lenses which are disposed at the front of the extensible bellows portion in any suitable or usual manner. In this opening $a^1$ a suitable portion or plate $b$ of frosted glass, ground glass or other suitable material, assembled within any suitable frame $b^2$, is mounted by means of a strip or strips of elastic or resilient material or in any other movable manner so as to allow the frosted glass or focusing member $b$ to be pressed inward from the plane of the rear casing member $a$, but automatically returned and retained in normal position.

Before this focusing member $b$ the photographic film is adapted to pass, it being understood that the specific form of film described herein is not claimed by me, said form of film being shown in the patent to Albrecht, No. 687,184, patented November 26, 1901. In order to permit the focusing to be effected without any obstruction being caused by the film, this film may be constituted or composed of alternately sensitized portions and non-sensitized portions, and each of the non-sensitized portions is advantageously furnished with an aperture of circular or other formation, so that in focusing, one of the apertures in the non-sensitized portions is wound or otherwise brought into position before the frosted glass member $b$, and a clear unimpeded way is thus furnished between the lens and the said focusing glass member $b$ and the bellows portion may be readily extended or contracted to bring the image into proper focus onto the glass member.

It is not however necessary that the film should be composed of alternately sensitized and non-sensitized portions, as the said film may be wholly sensitized or of the usual type and have apertures of any desired formation furnished therein at suitable positions along the length of same.

The focusing is rendered absolutely accurate and exact by causing the focusing member $b$ to be inserted or disposed in position in the plane of the film $c$ during the period of focusing and automatically returned to its normal position after such focusing has been effected.

To this end a folding focusing hood or screen $d$ is fixed upon the rear outer face of the camera casing $a$ which hood $d$ may advantageously comprise a plurality of flap doors or like members, say for instance four flaps which are adapted to be extended out at right angles to the face of the casing $a$ so as to form a projecting box-like member forming an effective screen or shade to the eyes when in the act of focusing.

The flap or cover members $d$ advantageously surround the focusing member $b$ and are conveniently mounted or hinged in such a manner that when same are extended out from the casing they cause the focusing member to be pressed inward into the casing and retained in position in the plane normally occupied by the film $c$. The closing of the flaps or covers $d$ causes the focusing member $b$ to again return to its normal position, and the said flaps when closed are folded one over the other so as to prevent any light from entering the camera casing through the focusing glass member.

In one method of automatically moving or adjusting the focusing glass member $b$, the hood or screen flaps or covers $d$ may be hinged or pivoted to the casing $a$ and may have small projections $d^1$ upon their hinged edges adapted to engage with or press against the glass member $b$ or its frame $b^2$ when the flaps $d$ are moved on their hinges so as to extend same, said projections $d^1$ causing the glass member $b$ to be pressed and retained in the plane of the film $c$. The closing of the hood flaps $d$ allows the return of the glass member to its normal position either by resilient or elastic material or members or by directly fixing the said glass member to the flaps.

Advantageously spring wires $e$ may be suitably incorporated at the upper and lower edges of the focusing member $b$ or frame $b^2$ surrounding same and running alongside or parallel with said edges, the spring wire being secured midway of its length and engaging at each extremity with a suitable small pin or projection upon the edges of the frame $b^2$, so as to normally hold the focusing member $b$ and frame in its retracted position within the aperture $a^1$ in the rear of the casing $a$.

The focusing member $b$ together with hood $d$ are advantageously secured in position by means of the outer frame portion $b^1$, which is screwed or otherwise secured upon the outer or rear face of the casing $a$. The frame $b^1$ is conveniently provided with inwardly projecting pins or projections $b^3$ at each corner, which pins are adapted to engage with or are inserted within corresponding apertures within the corner of the frame $b^2$ of the focusing member $b$.

The frame $b^2$ of the focusing member $b$ is conveniently of the usual channel formation the frosted glass being assembled within said channels. The pins $b^3$ upon the frame $b^1$ are advantageously provided with heads, which heads are adapted to slide within the apertures in the corners of the frame $b^2$ when the focusing member $b$ is pressed inward for focusing, but come into engagement with or butt against the rear flange of the channel frame $b^2$ or a suitable member or portion thereof so as to prevent the said frame with the frosted glass $b$ from being completely removed from said projecting pins $b^3$ and at the same time determining the distance to which the member $b$ can be displaced.

The assembling and operation of the focusing glass member $b$ may however be otherwise suitably arranged or provided for, so long as the same result is effected.

It is readily understood that when the focusing has taken place and the focusing glass member returned to its normal position and the focusing screen folded, the film is wound until one of the sensitized or imperforate portions is in the position previously occupied by the focusing glass member, the focusing having been effected in an accurate manner.

What I claim as my invention and desire to secure by Letters Patent is:—

1. A photographic camera adapted to use roll films comprising in combination, a movable focusing screen, a folding focusing hood, means whereby said movable focusing screen is displaced from its normal position to the position normally occupied by the sensitized portion of said film by the opening of said focusing hood.

2. A photographic camera adapted to use roll films comprising in combination, a movable focusing screen disposed at the rear of the camera, a plurality of hinged flaps forming a folding focusing hood, projections on said hinged flaps adapted, when said focusing hood is extended, to engage said movable focusing screen and displace it into the normal plane of the film during the focusing operation.

In witness whereof I have hereunto set my hand in the presence of two witnesses.

EDWIN FRANCIS HARPER.

Witnesses:
 LEWIS D. COOKE,
 ARTHUR H. BROWN.